United States Patent
Iino et al.

(10) Patent No.: US 11,188,767 B2
(45) Date of Patent: Nov. 30, 2021

(54) IMAGE GENERATION DEVICE AND IMAGE GENERATION METHOD

(71) Applicant: DENSO TEN Limited, Kobe (JP)

(72) Inventors: Masahiro Iino, Kobe (JP); Michihiro Takada, Kobe (JP); Mayuko Maeda, Kobe (JP)

(73) Assignee: DENSO TEN Limited, Kobe (JP)

( * ) Notice: Subject to any disclaimer, the term of this patent is extended or adjusted under 35 U.S.C. 154(b) by 39 days.

(21) Appl. No.: 16/705,450

(22) Filed: Dec. 6, 2019

(65) Prior Publication Data

US 2020/0311441 A1  Oct. 1, 2020

(30) Foreign Application Priority Data

Mar. 28, 2019 (JP) .............................. JP2019-062650

(51) Int. Cl.
| | |
|---|---|
| *B60R 1/00* | (2006.01) |
| *G06K 9/00* | (2006.01) |
| *H04N 7/18* | (2006.01) |
| *G06T 17/05* | (2011.01) |

(52) U.S. Cl.
CPC .......... *G06K 9/00791* (2013.01); *B60R 1/00* (2013.01); *G06T 17/05* (2013.01); *H04N 7/181* (2013.01); *B60R 2300/105* (2013.01); *B60R 2300/303* (2013.01); *B60R 2300/607* (2013.01); *G06T 2200/04* (2013.01); *G06T 2200/08* (2013.01)

(58) Field of Classification Search
CPC .... G06K 9/00791; H04N 7/181; G06T 17/05; G06T 2200/08; G06T 2200/04; G06T 15/20; G06T 19/006; B60R 1/00; B60R 2300/607; B60R 2300/303; B60R 2300/105

See application file for complete search history.

(56) References Cited

U.S. PATENT DOCUMENTS

| 9,479,740 B2* | 10/2016 | Moriyama | ............... H04N 7/18 |
| 2011/0234801 A1* | 9/2011 | Yamada | ............. H04N 5/23293 |
| | | | 348/148 |
| 2012/0105643 A1* | 5/2012 | Ozaki | ...................... H04N 7/18 |
| | | | 348/148 |

(Continued)

FOREIGN PATENT DOCUMENTS

JP 2001-084391 A 3/2001

*Primary Examiner* — John W Miller
*Assistant Examiner* — Humam M Satti
(74) *Attorney, Agent, or Firm* — Oliff PLC (57) ABSTRACT

An image generation device includes: an image acquisition unit which acquires images taken by cameras installed in a vehicle; a storage unit which stores self vehicle data indicating the vehicle having such gloss that a certain region is higher in brightness than the other region; a bird's eye image generation unit which generates a neighborhood image that is an image of the vehicle and a neighborhood of the vehicle as viewed from a virtual point of view based on the acquired images; a 3D image generation unit which generates a three-dimensional self-vehicle image being a three-dimensional image of the vehicle; and an image synthesis unit which generates a synthesized image in which the self-vehicle image is superimposed on the neighborhood image, and the 3D image generation unit generates the three-dimensional self-vehicle image based on the self vehicle data that is read out from the storage unit.

4 Claims, 8 Drawing Sheets

(56) References Cited

U.S. PATENT DOCUMENTS

| | | | |
|---|---|---|---|
| 2014/0107888 A1* | 4/2014 | Quast | G06F 17/00 |
| | | | 701/36 |
| 2015/0139499 A1* | 5/2015 | Shimizu | G06T 5/50 |
| | | | 382/104 |
| 2019/0244023 A1* | 8/2019 | Havnor | G06K 9/00664 |
| 2021/0160432 A1* | 5/2021 | Yamamoto | B60R 1/00 |

* cited by examiner

IMAGE GENERATION DEVICE AND IMAGE GENERATION METHOD

CROSS-REFERENCE TO RELATED APPLICATIONS

This application is based on and claims priority under 35 USC 119 from Japanese Patent Application No. 2019-062650 filed on Mar. 28, 2019.

TECHNICAL FIELD

The present invention relates to a technique for generating an image and displaying it in a vehicle.

BACKGROUND ART

Conventionally, an image generation device shoots a neighborhood of a vehicle (mainly a vehicle driven by a driver, that is, a user of the vehicle; hereinafter referred to as a "self vehicle") with plural cameras installed in the self vehicle and generates an image of the neighborhood on the basis of the images taken. A synthesized image obtained by superimposing a vehicle image of the self vehicle (hereinafter referred to as a "self-vehicle image") on the neighborhood image is displayed on a display device.

The self-vehicle image is a collection of polygons (such as triangles and quadrilaterals) and is expressed as a polygon model, that is, a three-dimensional model, in a virtual three-dimensional space. A process for improving the appearance of a three-dimensional model by giving it a sense of texture by subjecting it to texture-adding processing is known commonly. The texture means an image or pattern for expressing a sense of texture or an atmosphere by attaching a three-dimensional model to the background or the like. A lighting process in also known that improves the appearance by performing, after formation of a self-vehicle image, processing of varying the quantity of light according to a point-of-view angle with respect to the self-vehicle image.

The invention of JP-A-2001-84391 has an object of generating a realistic image using shadowing, highlighting (including lighting), etc. in generating an image as seen from a prescribed point of view (virtual camera) in an object space (three-dimensional virtual space) in a game or the like. To this end, in the invention of JP-A-2001-84391, shadow objects and highlight objects each representing a manner of highlighting are prepared in advance. In the invention of JP-A-2001-84391, shadowing or highlighting is performed by laying such objects on part of such an object as a road or a vehicle.

Highlighting texture is mapped in the above manner, whereby an image can be displayed in which only a highlight region is displayed brightly. JP-A-2001-84391 also discloses a technique of superimposing an image that has been subjected to geometry processing (coordinate conversion, perspective transformation, etc.) according to point-of-view conversion.

The image generation method disclosed in JP-A-2001-84391 can generate an image, as seen from a desired position and direction, of an object obtained by multiple texture mapping of texture of an original picture and projection texture. This enables realistic expression of highlighting, shadowing, etc. and can thereby increase the degree of reality of an image.

SUMMARY OF INVENTION

Whereas such electronic devices as gaming machines are provided with abundant 3D computation resources, CPUs of electronic devices installed in vehicles are small in computation amount. This may cause a situation that highlighting (lighting) processing that requires high-level computation is too large in computation amount to be performed in a vehicle and drawing processing cannot be finished in time.

The present invention has been made in view of such situation and an object of the invention therefore is to provide an image processing device and an image processing method capable of producing a realistic expression of a self vehicle the appearance of which is equivalent to an appearance as would be obtained by lighting while suppressing the amount of computation.

The invention provides an image generation device comprising an image acquisition unit which acquires images taken by cameras installed in a vehicle; a storage unit which stores self vehicle data indicating the vehicle having such gloss that a certain region is higher in brightness than the other region; a bird's eye image generation unit which generates a neighborhood image that is an image of the vehicle and a neighborhood of the vehicle as viewed from a virtual point of view on the basis of the acquired images; a 3D image generation unit which generates a three-dimensional self-vehicle image; and an image synthesis unit which generates a synthesized image in which the self-vehicle image is superimposed on the neighborhood image, wherein the 3D image generation unit generates the three-dimensional self-vehicle image on the basis of the self vehicle data that is read out from the storage unit.

The invention makes it possible to reduce the amount of computation while securing the quality of a self vehicle image.

DETAILED DESCRIPTION OF THE INVENTION

An embodiment of the present invention will be hereinafter described in detail with reference to the drawings. In the drawings, the same or equivalent elements are given the same reference symbols and will not be described redundantly.

<1. Configuration>

Figure 1:
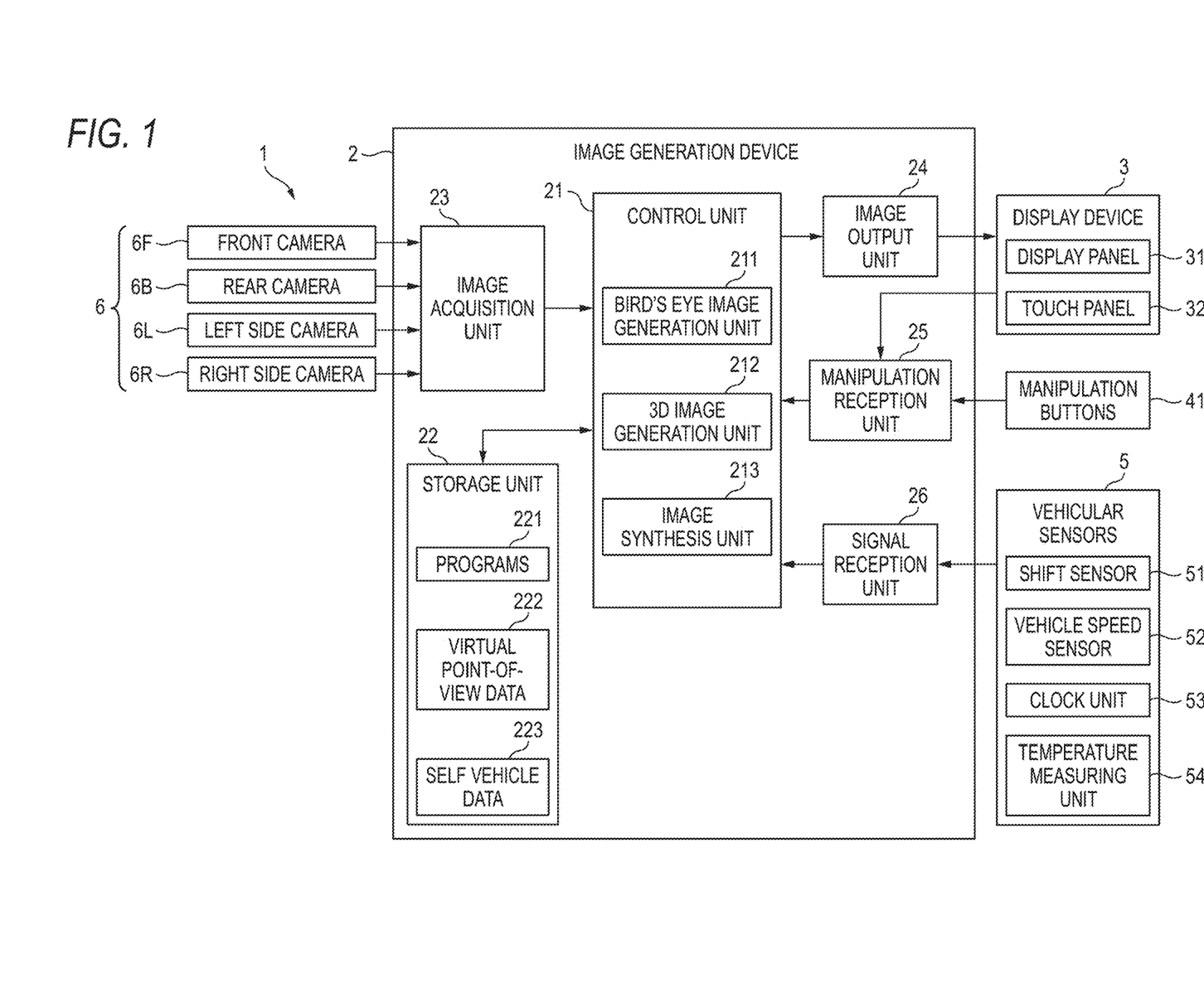
FIG. 1 is a functional block diagram showing the configuration of an image display system according to an embodiment of the present invention.

FIG. 1 is a functional block diagram showing the configuration of an image display system 1 which is used in a vehicle 7 (any of various kinds of vehicles such as a car, a truck, a bus, and a work vehicle) driven by a user (hereinafter referred to as a "driver"). The image display system 1 has a function of generating an image of a neighborhood of the self vehicle 7 (hereinafter referred to as a "neighborhood image AP") and displaying it to the driver sitting in the vehicle compartment. This allows the driver sitting in the vehicle compartment to immediately recognize the neighborhood of the self vehicle 7.

As shown in FIG. 1, the image display system 1 is equipped with an image generation device 2, a display device 3, manipulation buttons 41, vehicle sensors 5, and plural cameras 6.

The plural cameras 6 are installed in the self vehicle 7. Each of the plural cameras 6 generates an image by shooting a neighborhood of the self vehicle 7 and outputs the generated image to the image generation device 2. The image generation device 2 generates a synthesized image including a vehicle image of the self vehicle 7 (hereinafter referred to as a "self-vehicle image 7A") using the image of the neighborhood of the self vehicle 7.

Figure 2:
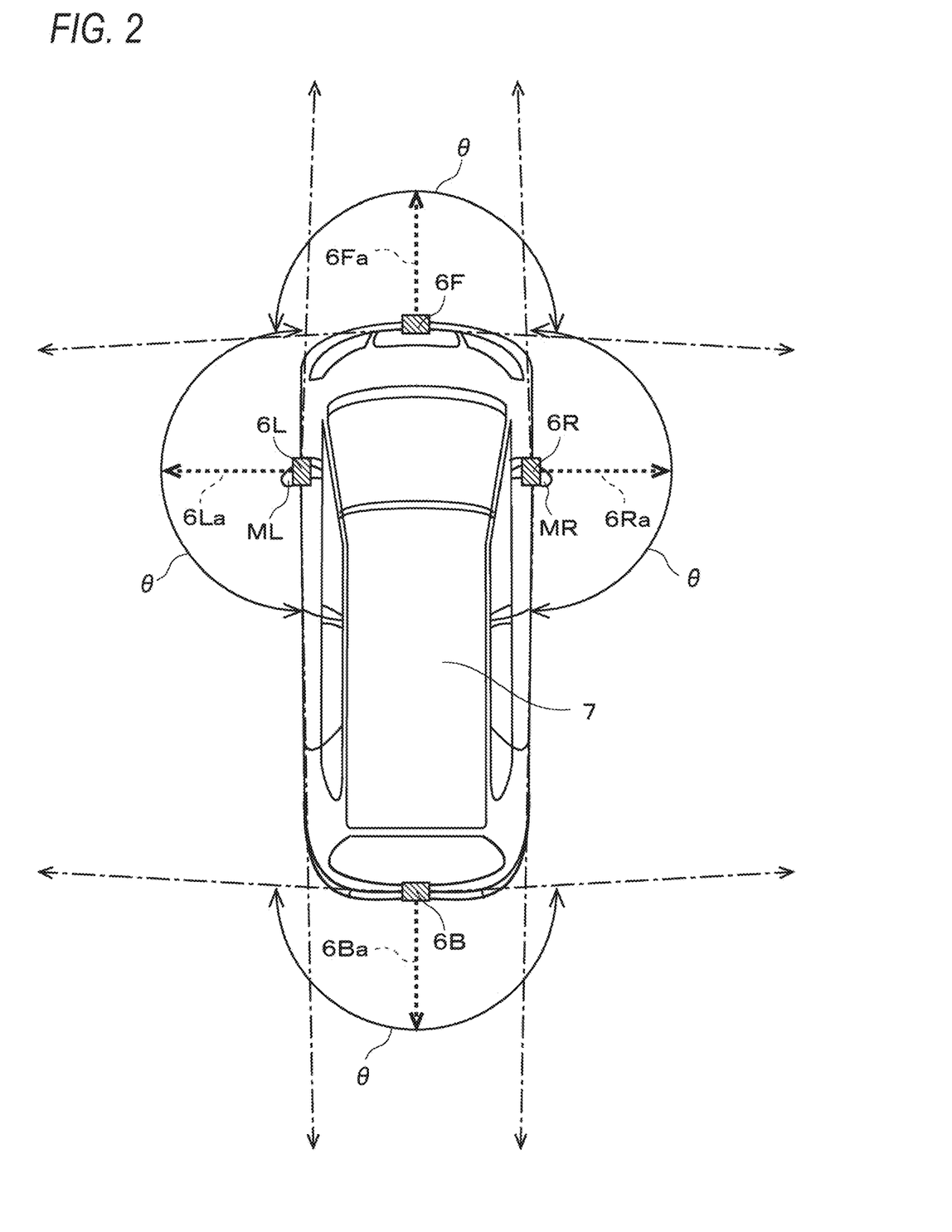
FIG. 2 is a plan view showing shooting directions of four respective cameras.

FIG. 2 is a plan view showing shooting directions of plural cameras 6, that is, the four cameras 6F, 6B, 6L, and 6R, respectively. The front camera 6F is installed at the front end of the self vehicle 7 and its optical axis direction 6Fa is directed to the front side of the self vehicle 7. The rear camera 6B is installed at the rear end of the self vehicle 7 and its optical axis direction 6Ba is directed to the rear side of the self vehicle 7.

The left side camera 6L is installed on a left side mirror ML and its optical axis direction 6La is directed to the left side of the self vehicle 7 (perpendicular to the advancement direction of the self vehicle 7). The right side camera 6R is installed on a right side mirror MR and its optical axis direction 6Ra is directed to the right side of the self vehicle 7 (perpendicular to the advancement direction of the self vehicle 7).

Being wide-angle lenses such as fisheye lenses, the cameras 6F, 6B, 6L, and 6R each have an angle of view that is larger than or equal to 180°. Thus, all of a surrounding of the self vehicle 7 can be shot using the four cameras 6F, 6B, 6L, and 6R.

Returning to FIG. 1, the display device 3 is equipped with a thin display panel 31 such as a liquid crystal display panel and displays various kinds of information and images. The display device 3 is installed in, for example, an instrument panel of the self vehicle 7 to allow the driver to see its screen.

The display device 3 may either be housed in the same housing as the image generation device 2 and integrated with it or be a device that is separate from the image generation device 2. Equipped with a touch panel 32 that is formed on the display panel 31, the display device 3 can receive a manipulation of the driver.

The manipulation buttons 41 are manipulation members for receiving a manipulation of the driver. The manipulation buttons 41 are installed on, for example, the steering wheel of the self vehicle 7 and receive mainly a manipulation of the driver. The driver can perform various manipulations on the image display system 1 through the manipulation buttons 41 and the touch panel 32 of the display device 3.

In the following, the manipulation buttons 41 and the touch panel 32 of the display device 3 will be referred to together as a "manipulation unit 4." When the display device 3 is manipulated by the driver, a manipulation signal indicating the content of the manipulation is input to the image generation device 2. Manipulations to be performed by the driver include a point-of-view change request.

The vehicular sensors 5 are sensors for acquiring information indicating a state of the self vehicle 7. A shift sensor 51 acquires a signal indicating a shift position (shift lever position) of a transmission of the self vehicle 7 and outputs it to a signal reception unit 26. A vehicle speed sensor 52 acquires a signal corresponding to a speed of the self vehicle 7 and generated on the basis of a rotation speed of an axle of the self vehicle 7 and outputs it to the signal reception unit 26. A clock unit 53 acquires a current date/time information and outputs it to the signal reception unit 26. A temperature measuring unit 54 acquires temperature information relating to the self vehicle 7 and outputs it to the signal reception unit 26.

The image generation device 2 is a control device of the image display system 1 and controls the display device 3, the manipulation unit 4, the vehicular sensors 5, and the plural cameras 6. The image generation device 2 is mainly equipped with a control unit 21, a storage unit 22, an image acquisition unit 23, an image output unit 24, a manipulation reception unit 25, and the signal reception unit 26.

The storage unit 22 is, for example, a nonvolatile memory such as a flash memory and stores various kinds of information. The storage unit 22 is stored with programs 221 that are firmware and various kinds of data to be used in generating a neighborhood image or a synthesized image. The storage unit 22 is stored with, as other data to be used for generation of a neighborhood image, virtual point-of-view data 222 that are data including plural virtual points of view and line-of-sight directions and are to be used in a bird's eye image generation unit 211. The storage unit 22 is also stored with self vehicle data 223 to be used in generating a self vehicle image 7A (described above).

The image acquisition unit 23 acquires data of images taken by the four respective cameras 6F, 6B, 6L, and 6R. The image acquisition unit 23 has image processing functions such as a function of converting an analog image taken to a digital image. The image acquisition unit 23 performs prescribed image processing on data of acquired images taken and outputs resulting image data to the control unit 21.

The image output unit 24 outputs a synthesized image generated by the control unit 21 to the display unit 3 and has it displayed on the display device 3.

The manipulation reception unit 25 receives a manipulation signal that may be a point-of-view change request from the driver and is output from the manipulation unit 4, and outputs a driver manipulation signal to the control unit 21. The control unit 21 can generate a self vehicle image 7A as viewed from a point of view corresponding to the manipulation of the driver.

The signal reception unit 26 receives vehicle information from the vehicular sensors 5 which are provided in the self vehicle 7 separately from the image generation device 2, and outputs it to the control unit 21. For example, the signal reception unit 26 receives a signal indicating a shift position (shift lever position) of the transmission of the self vehicle 7 from the shift sensor 51 and outputs the received signal to the control unit 21.

The signal reception unit 26 receives, from the vehicle speed sensor 52, a signal corresponding to a speed of the self vehicle 7 and generated on the basis of a rotation speed of an axle of the self vehicle 7 and outputs it to the control unit 21.

The signal reception unit 26 receives information relating to a current time from the clock unit 53 and outputs it to the control unit 21. Furthermore, the signal reception unit 26 receives information relating to an ambient temperature of the self vehicle 7 and outputs it to the control unit 21.

The control unit 21, which is, for example, a microcomputer that is equipped with a CPU, a RAM, a ROM etc., controls, in a unified manner, the entire image generation device 2, that is, the storage unit 22, the image acquisition unit 23, the image output unit 24, the manipulation reception unit 25, and the signal reception unit 26. Various functions of the control unit 21 are realized by the CPU's performing computation according to the programs 221 etc. stored in the storage unit 22. The control unit 21 is equipped with the bird's eye image generation unit 211, a 3D image generation unit 212, and an image synthesis unit 213.

The control unit 21 receives a driver manipulation signal from the manipulation reception unit 25 and generates a self vehicle image 7A as viewed from a point of view corresponding to the driver manipulation signal. The control unit 21 receives a shift signal from the signal reception unit 26 and judges whether the self vehicle 7 is moving forward or backward. The control unit 21 receives vehicle speed information from the signal reception unit 26 and calculates a current vehicle speed. The control unit 21 receives time information of the clock unit 53 from the signal reception unit 26 and recognizes a current time. The control unit 21 receives temperature information from the signal reception unit 26 and recognizes an ambient temperature situation around the self vehicle 7 on the basis of the received temperature information.

The bird's eye image generation unit 211 acquires images taken by the plural cameras 6 from the image acquisition unit 23. Using the acquired images, the bird's eye image generation unit 211 generates a neighborhood image representing a neighborhood of the self vehicle 7 as viewed from a virtual point of view. The virtual point of view is a bird's eye point of view for looking down at the self vehicle 7 from a position outside it or a point of view that is located in the neighborhood of the self vehicle 7 and is a dead point for the driver.

The 3D image generation unit 212 generates a self vehicle image 7A that is a vehicle image of the self vehicle 7 to be superimposed on the peripheral image by reading out the self vehicle data 223 from the storage unit 22. The self vehicle image 7A is a vehicle image as viewed from one virtual point of view to which texture TX is stuck to the entire surface of a polygon model PG of the self vehicle 7 (described later). The self vehicle image 7A is displayed with such gloss that the brightness is higher in a certain region than in the other region.

Plural kinds of self vehicle data 223 may be prepared in the storage unit 22 in which case one of them is selected as appropriate by the driver or according to such a condition as an environment condition and read out from the storage unit 22. A self vehicle image 7A is generated by the 3D image generation unit 212 on the basis of the read-out self vehicle data 223.

The image synthesis unit 213 generates a synthesized image by superimposing the self vehicle image 7A generated by the 3D image generation unit 212 on the neighborhood image generated by the bird's eye image generation unit 211. The generated synthesized image is output to the image output unit 24. The control unit 21 generates, in the above-described manner, a neighborhood image representing a neighborhood of the self vehicle 7, a self vehicle image 7A that is a vehicle image of the self vehicle 7, and a synthesized image obtained by superimposing the self vehicle image 7A on the neighborhood image in this manner, and also generates other images.

<2. Generation of Synthesized Image>

Figure 3:
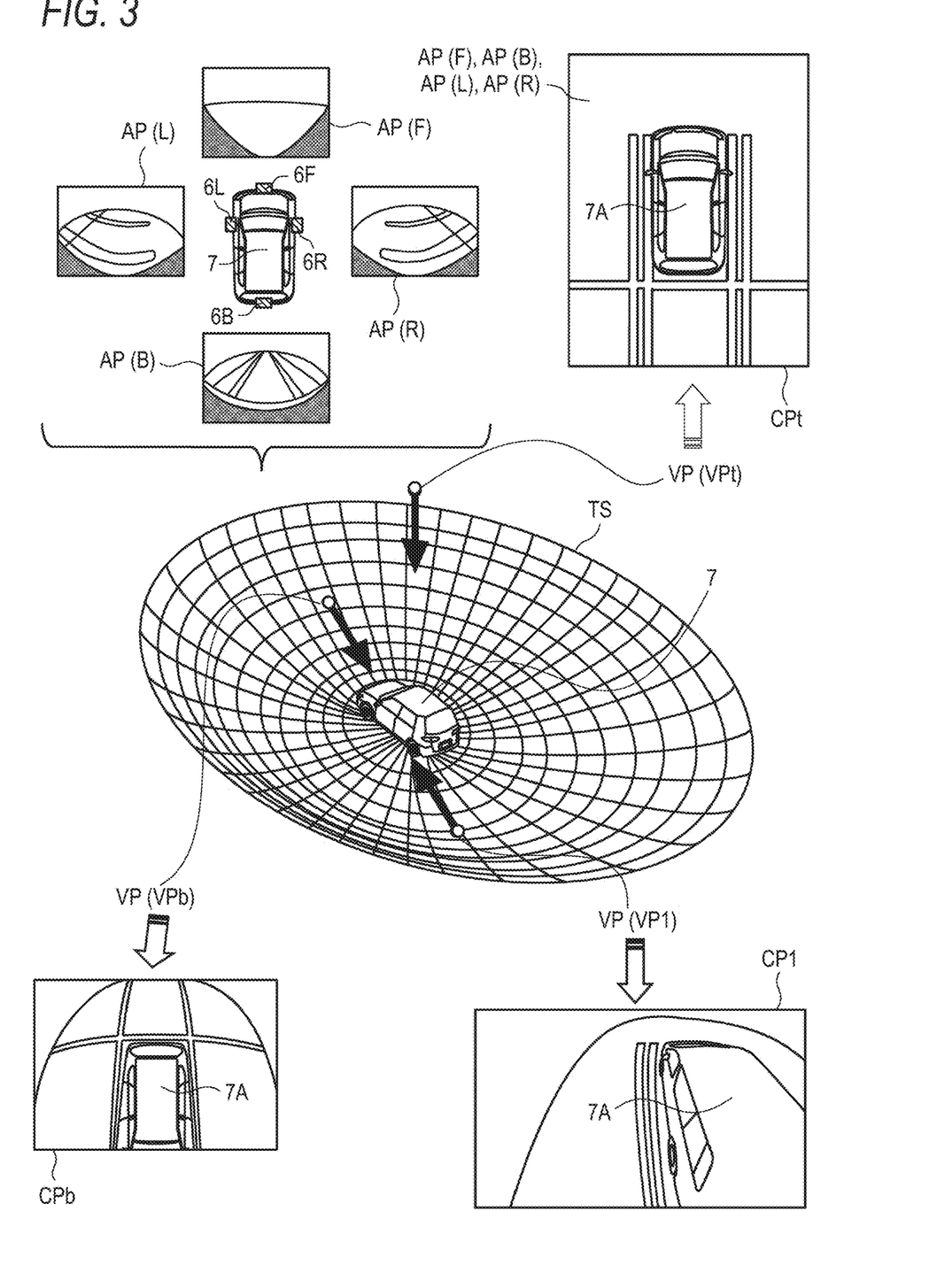
FIG. 3 is a diagram illustrating a neighborhood image, a self vehicle image, and a synthesized image.

Next, a description will be made of a technique by which the image synthesis unit 213 generates a synthesized image by superimposing a self vehicle image 7A on a neighborhood image AP. FIG. 3 is a diagram illustrating a neighborhood image AP, a self vehicle image 7A, and a synthesized image.

First, the front camera 6F, the rear camera 6B, the left side camera 6L, and the right side camera 6R shoot a neighborhood of the self vehicle 7, whereby the image acquisition unit 23 acquires four images, that is, a front image AP(F), a rear image AP(B), a left side image AP(L), and a right side image AP(R) of a front neighborhood, a rear neighborhood, a left neighborhood, and a right neighborhood of the self vehicle 7. The four images include image data of the entire neighborhood of the self vehicle 7.

The bird's eye image generation unit 211 projects data (pixel values) included in the four images AP(F), AP(B), AP(L), and AP(R) onto a projection surface TS that is a three-dimensional curved surface in a virtual three-dimensional space. The projection surface TS is a semispherical surface (bowl-shaped surface), for example. A central portion (bowl bottom portion) of the projection surface TS is a portion where the self vehicle 7 exists. Portions, other than the central portion, of the projection surface TS are correlated with the four images AP(F), AP(B), AP(L), and AP(R).

The bird's eye image generation unit 211 projects the neighborhood images AP(F), AP(B), AP(L), and AP(R) onto the portions, other than the central portion, of the projection surface TS. The bird's eye image generation unit 211 projects the image AP(F) of the front camera 6F onto the portion, corresponding to the front side of the self vehicle 7, of the projection surface TS and projects the image AP(B) of the rear camera 6B onto the portion, corresponding to the rear side of the self vehicle 7, of the projection surface TS. The bird's eye image generation unit 211 projects the image AP(L) of the left side camera 6L onto the portion, corresponding to the left side of the self vehicle 7, of the projection surface TS and projects the image AP(R) of the right side camera 6L onto the portion, corresponding to the right side of the self vehicle 7, of the projection surface TS. As a result, a neighborhood image AP representing the entire neighborhood of the self vehicle 7 is generated. That is, the neighborhood image AP is an image generated from the images AP(F), AP(B), AP(L), and AP(R).

Then the bird's eye image generation unit 211 sets a virtual point of view VP that is located at a desired position and directed to a desired direction in the three-dimensional space according to a point-of-view request from the driver received by the manipulation unit 4. Example virtual points of view VP are denoted by VP(VPt), VP(VPb), and VP(VP1) in FIG. 3 and setting may be made to one of them according to a point-of-view request from the driver. The bird's eye image generation unit 211 cuts out image data that are projected in a region that is included in an angle of view that is set at the thus-set virtual point of view VP. The bird's eye image generation unit 211 generates a neighborhood image AP representing a portion of the neighborhood of the self vehicle 7 that is seen from the virtual point of view VP on the basis of the cut-out image data.

The 3D image generation unit 212 reads out the self vehicle data 223 from the storage unit 22 and generates a self vehicle image 7A as viewed from the virtual point of view VP. Then the image synthesis unit 213 generates a synthesized image CP by combining the self vehicle image 7A with the neighborhood image AP representing the portion of the neighborhood of the self vehicle 7 that is seen from the virtual point of view VP.

If a virtual point of view VPt is set that is located right over the self vehicle 7 and directed right downward, the image synthesis unit 213 generates a synthesized image CPt as obtained when the self vehicle 7 and its neighborhood is looked down at using the neighborhood images AP(F), AP(B), AP(L), and AP(R) and the self vehicle image 7A. The synthesized image CPt is an image as obtained when the self vehicle 7 is looked down at from right above and represents the entire neighborhood of the self vehicle 7. The image synthesis unit 213 displays the synthesized image CPt if no particular request relating to a point-of-view position is received from the manipulation unit 4.

If a virtual point of view VPb is set that is located above and in front of the self vehicle 7 and directed down rearward, the image synthesis unit 213 generates a synthesized image CPb as obtained when the self vehicle 7 and its neighborhood is looked down at using the neighborhood images AP(B), AP(L), and AP(R) and the self vehicle image 7A. The synthesized image CPb is an image as obtained when the self vehicle 7 is looked down at from a top-front position and represents a portion, excluding a front portion, of the self vehicle 7 and a portion, excluding a front portion, of the neighborhood.

If a virtual point of view VP1 is set that is located above and on the rear-left of the self vehicle 7 and directed downward and toward the front-right side, the image synthesis unit 213 generates a synthesized image CP1 as obtained when the self vehicle 7 and its neighborhood is looked down at using the neighborhood images AP(F), AP(L), and AP(R) and the self vehicle image 7A. The synthesized image CP1 is an image as obtained when the self vehicle 7 is looked down at from a position that is located above and on the rear-left side and represents a left side portion of the self vehicle 7 and a portion, located on the left of the self vehicle 7, of the neighborhood.

<3.1 Generation of Self Vehicle Data 223>

Next, a procedure for generating self vehicle data 223 to be stored in the storage unit 22 will be described with reference to FIGS. 4 and 5. The procedure for generating self vehicle data 223 mainly consists of four steps, and the process is executed by a device that is separate from the image generation device 2 and can perform 3D computation.

An overall flow of the four steps will be described first. First, a polygon model PG is prepared in the device capable of 3D computation (step 1; see part (a) of FIG. 4). Then the device capable of 3D computation develops the polygon model PG on a two-dimensional plane (UV coordinates) (step 2; see part (b) of FIG. 4). Then the device capable of 3D computation generates texture TX that is suitable for the polygon model PG developed on the two-dimensional plane (step 3; see part (a) of FIG. 5). Finally, the device capable of 3D computation sticks the texture TX to the polygon model PG developed on the two-dimensional plane (step 4; see part (b) of FIG. 5).

Figure 4:
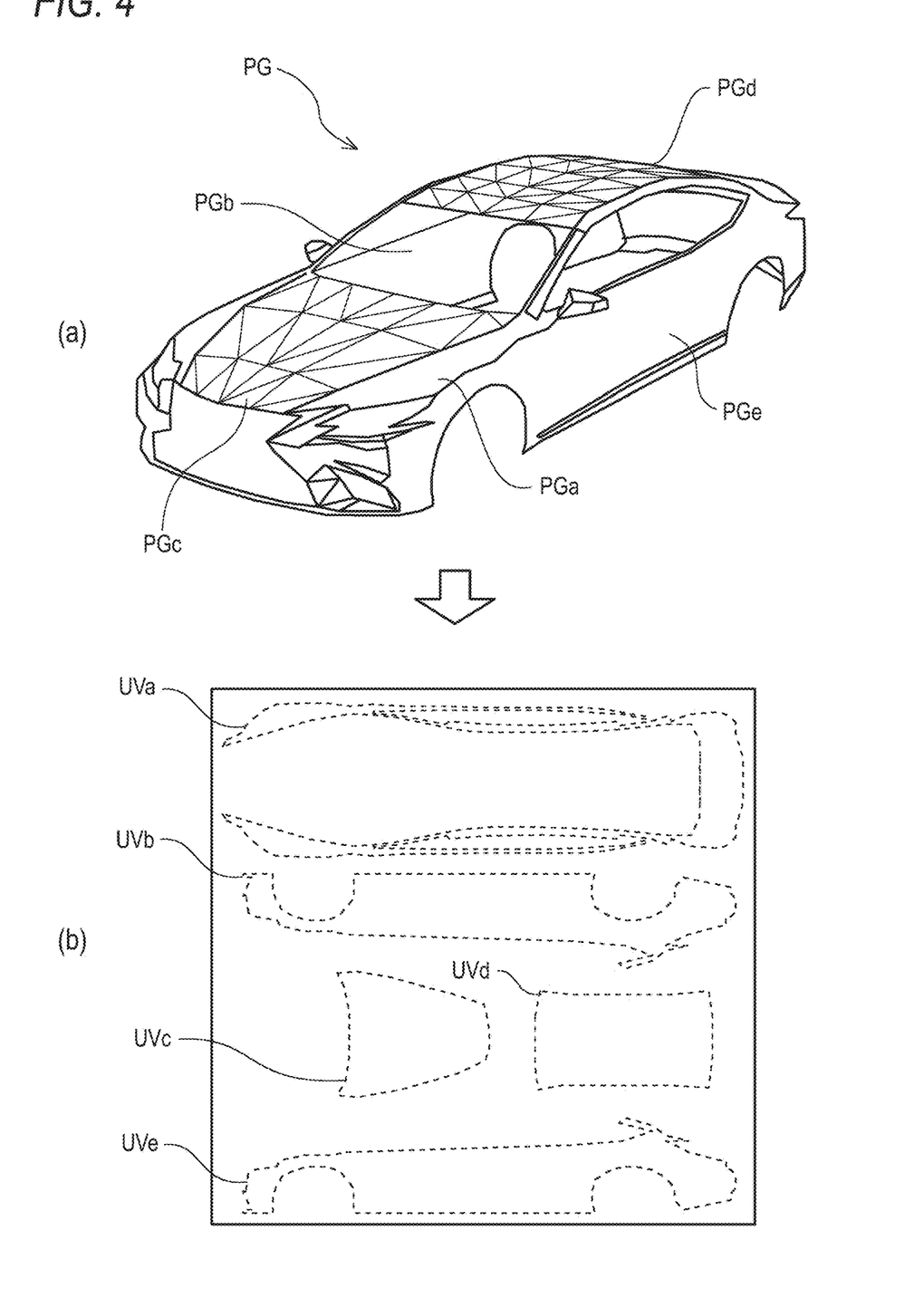
FIG. 4 is an imagery perspective view showing a polygon model of self vehicle data and a diagram showing the polygon model as developed on a two-dimensional plane.

FIG. 4 is an imagery perspective view showing a polygon model PG for self vehicle data 223 and a diagram showing the polygon model PG as developed on a two-dimensional plane. The details of steps 1 to 4 for generating self vehicle data 223 will be described below with reference to FIGS. 4 and 5. As shown in part (a) of FIG. 4, the polygon model PG is a base of generation of a self vehicle image 7A. The polygon model PG is a model in which a three-dimensional shape is expressed as a collection of polygons such as triangles and quadrilaterals; triangular polygons are used mainly.

Although in part (a) of FIG. 4 triangles constituting the polygon model PG are shown only in a region PGd corresponding to a roof panel of the self vehicle 7 and a region PGc corresponding to a hood of the self vehicle 7 for the sake of convenience, in actuality the entire self vehicle 7 is expressed by a collection of triangular polygons. A three-dimensional movement can be expressed by the control unit 21's moving the polygon model PG in a virtual space.

However, since the design performance is low if only the polygon model PG is used, in the embodiment the appearance is improved by performing processing of sticking texture TX to the polygon model PG (what is called texture mapping). The texture mapping will be described below.

<3.2 Procedure of Texture Mapping>

Part (b) of FIG. 4 is a diagram in which the polygon model PG which is virtual three-dimensional data is developed on a two-dimensional plane (UV coordinates). The details of a developing method will not be described; this technique is commonly known and is also employed in the invention.

The correspondence between parts (a) and (b) of FIG. 4 will be described below. A region PGc shown in part (a) of FIG. 4 as corresponding to the hood of the polygon model PG corresponds to a region UVc shown in part (b) of FIG. 4.

Likewise, a region PGd shown in part (a) of FIG. 4 as corresponding to the roof panel corresponds to a region UVd shown in part (b) of FIG. 4. A region PGa shown in part (a) of FIG. 4 corresponds to a region UVa shown in part (b) of FIG. 4. The region PGa includes fenders and roof side rails that are seen when the self vehicle 7 is looked down at from right above (the regions PGc and PGd are excluded).

Likewise, a region PGe shown in part (a) of FIG. 4 that includes side doors corresponds to a region UVe shown in part (b) of FIG. 4. A region PGb shown in part (a) of FIG. 4 that includes side doors corresponds to a region UVb shown in part (b) of FIG. 4.

Cases that the polygon model PG is seen from the front side or the rear side and small components such as mirrors are not shown in part (b) of FIG. 4; however, three-dimensional coordinates can be converted into two-dimensional coordinates in the same manner as described above also in these cases and for those components.

Figure 5:
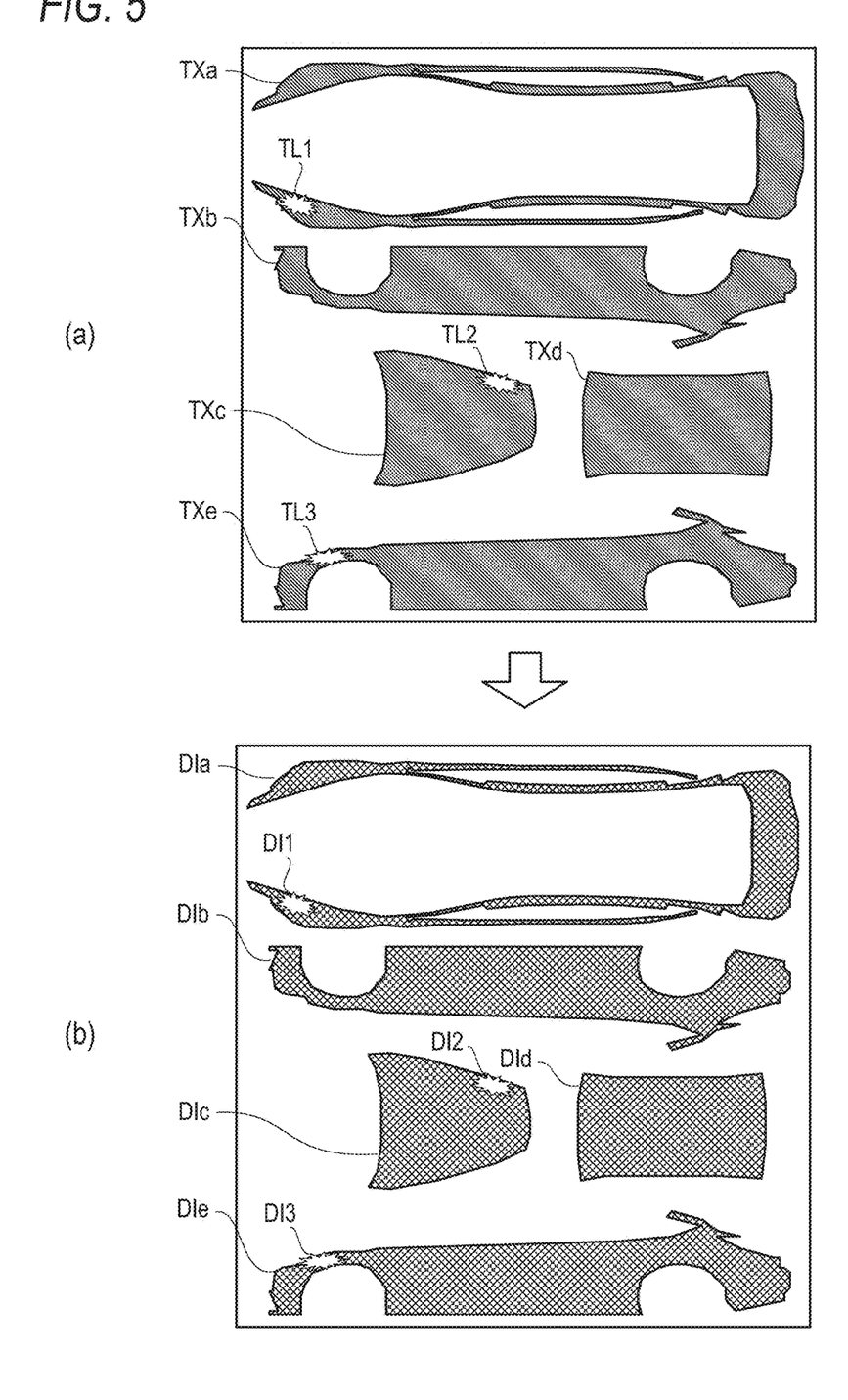
FIG. 5 is a diagram illustrating how two-dimensional texture images are stuck to polygons developed in the two-dimensional plane.

FIG. 5 is a diagram illustrating how two-dimensional texture is stuck to the polygons developed in the two-dimensional plane. Part (a) of FIG. 5 illustrates processing of performing texturing (texture mapping) on the regions UVa to UVe that are developed in the two-dimensional plane as shown in part (b) of FIG. 4. In certain cases, texture is generated by capturing actual images taken and performing editing.

In the embodiment, generating texture that simulates colors that would occur when lighting is made and sticking it to the entire surfaces of related polygons in texture mapping will be referred to as "quasi-lighting."

<3-3. Quasi-Lighting>

The quasi-lighting will be described in more detail with reference to FIG. 6. The quasi-lighting is performed so that the driver would feel realistic texture when seeing the self vehicle image 7A. First, to facilitate understanding of the quasi-lighting, a case that texturing is performed without quasi-lighting will be described with reference to part (a) of FIG. 6.

Figure 6:
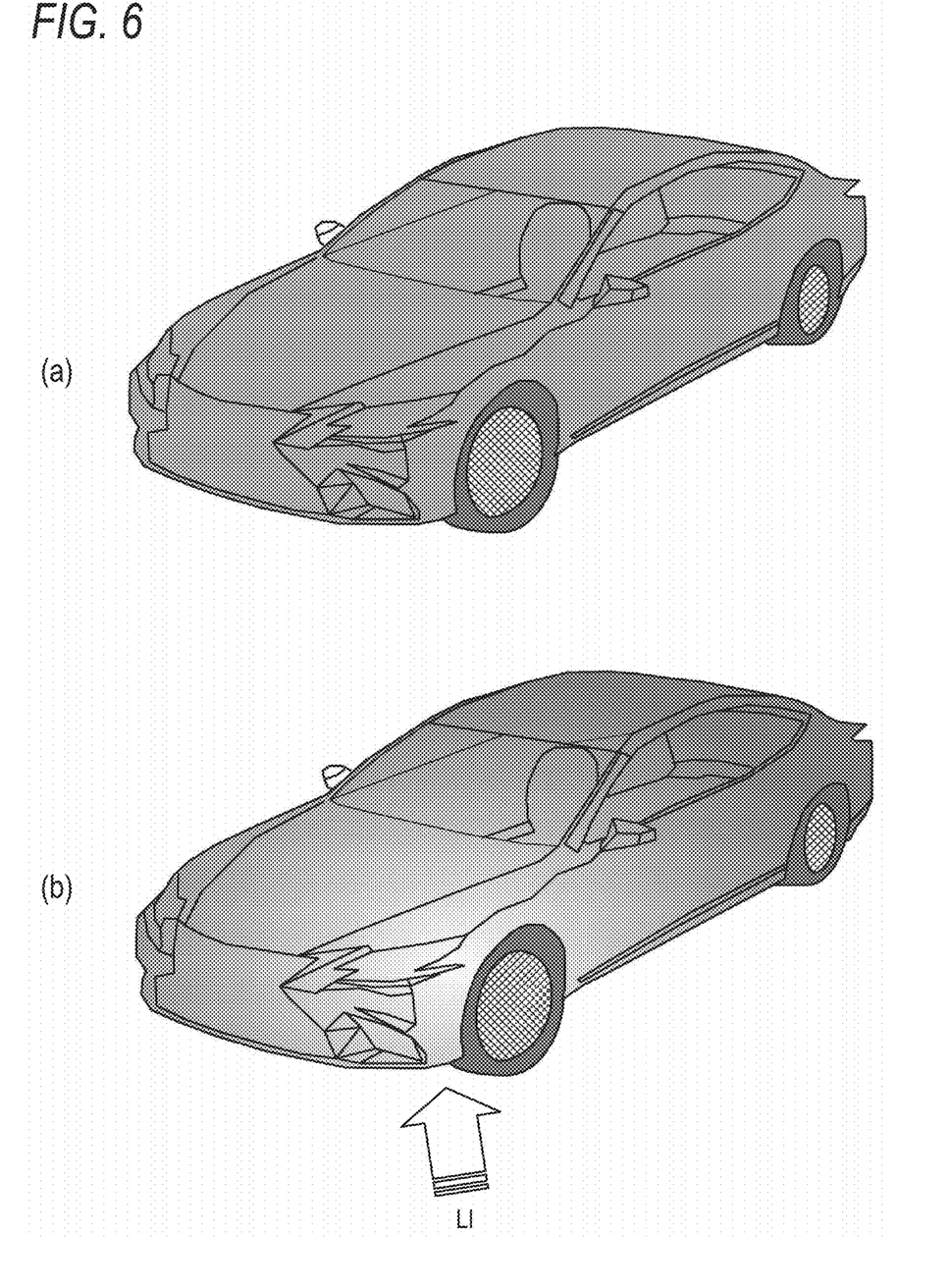
FIG. 6 shows self vehicle images that are not subjected to quasi-lighting and subjected to quasi-lighting, respectively.

Part (a) of FIG. 6 shows a self vehicle image in which texture is stuck to only part of the polygons (e.g., ones corresponding to a grill and lights) and lighting is not made. Since the self vehicle image is not given a lighting expression as obtained when the self vehicle 7 is illuminated with light from a particular direction, the self vehicle image is low in stereoscopicity and hence is poor in appearance.

On the other hand, part (b) of FIG. 6 shows a self vehicle image in which texture obtained by subjecting a portion LI of the vehicular image to lighting is stuck to the entire surfaces of related polygons (quasi-lighting). Generally speaking, in many cases, a vehicle located outdoors actually receives sunlight (during the daytime) or light from streetlamps (during the nighttime) and reflects part of the received light. The quasi-lighting reproduces this situation. The portion that is subjected to quasi-lighting is drawn in such a manner that pieces of color-related information as typified by luminance, hue, a value, transparency, etc. have such values as to represent a brighter surface. This makes it possible to express the quasi-lighting portion as if it were illuminated with light.

In the self vehicle image shown in part (b) of FIG. 6, a portion on the front-left of a driver (when viewed from the point of view of the driver who is sitting in an actual vehicle), that is, the left fender, a left portion of the front bumper, and a left portion of the hood of the vehicle are shining. Causing a particular portion of a texture-applied vehicular image to shine is called quasi-lighting (quasi-lighting portion: L1). The self vehicle image shown in part (b) of FIG. 6 that is subjected to quasi-lighting is higher in stereoscopicity and better in appearance than the self vehicle image shown in part (a) of FIG. 6.

Returning to the description of the procedure for generating self vehicle data 223, texture images TXa, TXb, TXc, TXd, and TXe having the same shapes as the regions UVa, UVb, UVc, UVd, and UVe shown in part (b) of FIG. 4, respectively, are prepared as shown in part (a) of FIG. 5.

At this time, to generate a self vehicle image as shown in part (b) of FIG. 6 that is subjected to quasi-lighting, quasi-lighting portions are drawn in regions TL1, TL2, and TL3 of the texture images TXa, TXc, and TXe shown in part (a) of FIG. 5, respectively.

Then processing of sticking the texture images to the polygons is performed in the device capable of 3D computation. Image data DIa shown in part (b) of FIG. 5 is generated by sticking the texture image TXa shown in part (a) of FIG. 5 to the region UVa shown in part (b) of FIG. 4 which is developed on the two-dimensional plane (UV coordinates). This means that the texture image TXa has been mapped on the polygon model PG at corresponding positions.

Likewise, the texture images TXb to TXe are stuck to the respective regions UVb to UVe, whereby image data DIb to DIe are generated. This means that the quasi-lighting portions (texture images) have been drawn (mapped) in the regions TL1, TL2, and TL3 in the two-dimensional plane to produce image data DI1 to DI3.

The texture mapping process described above with reference to FIGS. 4 and 5 has been executed in advance by 3D computation software that is provided in the device other than the image generation device 2. The generated image data DIa to DIe are imported to an authoring tool (UIC) or the like and data-converted into data that can be handled by the image generation device 2. The image data DIa to DIe as converted by the authoring tool (UIC) or the like are stored in the storage unit 22 of the image generation device 2 as self vehicle data 223. The image data DIa to DIe are expressed by the 3D image generation unit 212 of the image generation device 2 in the form of a virtual, three-dimensional self vehicle image 7A as viewed from a point of view requested by the user.

The description of the image generation device 2 is now restarted. If a new virtual point of view VPa is requested, the angle of view of the neighborhood image AP of the synthesized image is changed accordingly and a new self vehicle image 7A is generated according to the new virtual point of view VPa. At this time, the quasi-lighting portion (its position) is also changed in the self vehicle image 7A.

For example, if an instruction to generate a self vehicle image 7A as viewed from the virtual point of view VP1 shown in FIG. 3 is made, a self vehicle image 7A is generated in which the self vehicle 7 is seen from a position that is located above and on the rear-left of the self vehicle 7. As a result, the position of the quasi-lighting portion of the self vehicle image 7A is also moved. That is, a new self vehicle image 7A having a new quasi-lighting portion LI is displayed as shown in part (b) of FIG. 6.

As described above, a self vehicle image 7A that is subjected to lighting can be generated merely by displaying, as the self vehicle image 7A, self vehicle data that has been subjected to quasi-lighting in advance according to a virtual point of view VP. Since it is not necessary to perform lighting after generation of a self vehicle image 7A, the amount of computation can be reduced.

The above embodiment is directed to the case that self vehicle data 223 of one quasi-lighting portion are stored in the storage unit 22. That is, the image data DI1 to DI3 shown in part (b) of FIG. 5 are generated so that a portion on the front-left of the driver when viewed from the point of view of the driver sitting in the actual vehicle, that is, the left fender, a left portion of the front bumper, and a left portion of the hood, shine (see the self vehicle image shown in part (b) of FIG. 6).

However, another embodiment is possible in which the number of self vehicle data 223 is not equal to one, that is, plural kinds of self vehicle data 223 can be stored in the storage unit 22 so that at least one portion is always subjected to quasi-lighting even when the point-of-view position is changed. A description will be made of a case that the angle formed by the line connecting to the point-of-view position and the vehicle center located right under the point of view VPt shown in FIG. 3 and the line extending forward from the vehicle center is increased from 0° (corresponding to the front position) as the point-of-view position is changed clockwise. The point of view circle (angle: 0° to 360°) is divided into eight equal parts of 45°. An angular range (1) is from 22.5° to 67.5°, an angular range (2) is from 67.5° to 112.5°, . . . , an angular range (8) is from 337.5° to 22.5°.

If a point of view requested by the driver is within the angular range (1), self vehicle data 223 obtained by subjecting a front-right portion of the self vehicle 7 to quasi-lighting is selected from the plural kinds of self vehicle data 223 and read out and a self vehicle image 7A is generated using the read-out self vehicle data 223. Likewise, if a point of view requested by the driver is within the angular range (2), self vehicle data 223 obtained by subjecting a right side portion of the self vehicle 7 to quasi-lighting is read out and a self vehicle image 7A is generated using the read-out self vehicle data 223. If a point of view requested by the driver is within the angular range (8), self vehicle data 223 obtained by subjecting a front portion of the self vehicle 7 to quasi-lighting is read out and a self vehicle image 7A is generated using the read-out self vehicle data 223.

As described above, a self vehicle image 7A is generated on the basis of self vehicle data 223 obtained by subjecting a portion, corresponding to the position of a point of view requested by the driver (located in one of the eight angular ranges), of the self vehicle 7 to quasi-lighting. As a result, the self vehicle image 7A can always be expressed in such a manner that its portion is subjected to quasi-lighting and good appearance that is equivalent to appearance as would be obtained by lighting can always be secured.

<4. Change of Display Mode of Self Vehicle Image>

Although the above description has not concerned the kind of self vehicle image 7A, there exists a need to use plural self vehicle images 7A according to different situations to increase reality. For example, in actuality, the manner of incidence of light on a vehicle and the corresponding way the vehicle appears during the daytime are different from those during the nighttime.

However, where only one kind of self vehicle image 7A is provided, there may occur a case that it does not match a neighborhood image AP, in which case the driver or a passenger may feel it incongruous. In view of this, it is possible to store plural kinds of self vehicle data 223 in the storage unit 22 in advance and switches among them according to a situation.

For example, the storage unit 22 may be stored with different kinds of self vehicle data 223 obtained by performing different kinds of quasi-lighting for daytime and nighttime, in which case the image generation device 2 may select one of them and display a corresponding self vehicle image 7A. The control unit 21 judges whether it is daytime or nighttime now on the basis of time information received from the clock unit 53 of the vehicular sensors 5 via the signal reception unit 26 and causes the 3D image generation unit 212 to generate an appropriate self vehicle image 7A.

The control unit 21 may select a self vehicle image 7A according to temperature information acquired from the temperature measuring unit 54 via the signal reception unit 26 or an intention of the driver acquired from the manipulation unit 4, instead of whether it is daytime or nighttime now.

<5. Process Flow of Image Generation Device 2>

Figure 7:
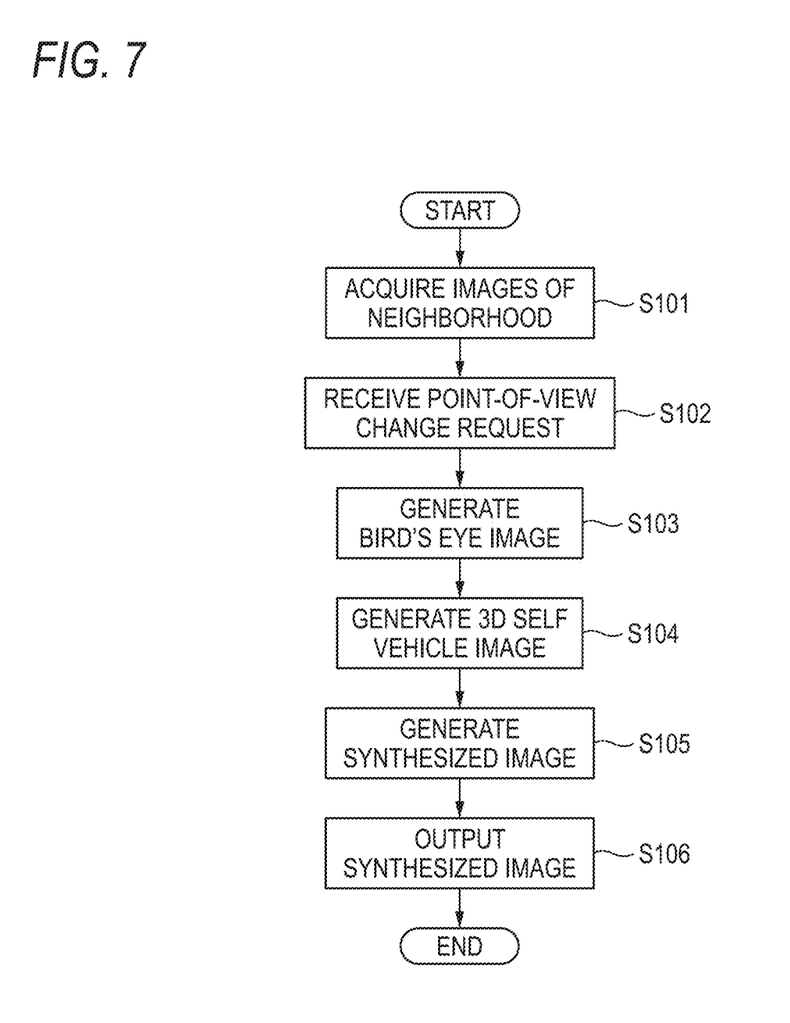
FIG. 7 is a flowchart of a synthesized image generation process that is executed by an image generation device according to the embodiment.

A process flow of the image generation device 2 will be described below with reference to FIG. 7. FIG. 7 is a flowchart of a synthesized image generation process that is executed by the image generation device 2.

At step S101, the image acquisition unit 23 acquires images of a neighborhood of the self vehicle 7 taken by the plural cameras 6. At step S102, the manipulation unit 4 receives, from the driver, a request for changing the point of view of a synthesized image.

At step S103, the bird's eye image generation unit 211 generates a neighborhood image AP that is suitable for the point-of-view change request received from the manipulation unit 4 on the basis of the images acquired by the image acquisition unit 23 and corresponding virtual point-of-view data 222. Absent point-of-view change request from the driver, the image synthesis unit 213 generates a neighborhood image AP as viewed from the point of view located right over the self vehicle 7.

At step S104, the 3D image generation unit 212 generates a three-dimensional self vehicle image 7A as viewed from a point of view of the point-of-view change request received from the manipulation unit 4 on the basis of the self vehicle data 223. Absent point-of-view change request from the driver, the 3D image generation unit 212 generates a self vehicle image 7A as viewed from the point of view located right over the self vehicle 7.

Figure 8:
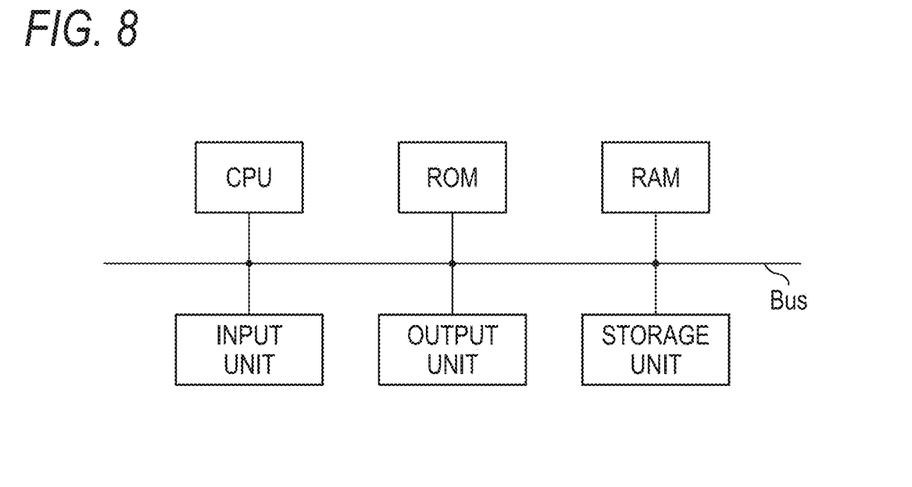
FIG. 8 is a block diagram showing an example hardware configuration for implementing each functional block of the image generation device according to the embodiment.

At step A105, the image synthesis unit 213 generates a synthesized image AS by combining the neighborhood image AP generated at step S103 with the self vehicle image 7A generated at step S104. At step S106, the control unit outputs the generated synthesized image to the display device 3.

Where each of the functional blocks of the image generation device 2 according to the embodiment (or modification) is implemented by, for example, software, each functional block may be realized by software processing using a hardware configuration shown in FIG. 8 in which a CPU, a ROM, a RAM, an input unit, an output unit, etc. are connected to each other by a bus.

As described above in detail, the image generation device 2 according to the embodiment is equipped with the image acquisition unit which acquires images taken by the cameras installed in the vehicle, the storage unit which stores self vehicle data indicating the vehicle having such gloss that a certain region is higher in brightness than the other region, the bird's eye image generation unit which generates a neighborhood image that is an image of the vehicle and a neighborhood of the vehicle as viewed from a virtual point of view on the basis of the acquired images, the 3D image generation unit which generates a three-dimensional self-vehicle image, and the image synthesis unit which generates a synthesized image in which the self-vehicle image is superimposed on the neighborhood image. The 3D image generation unit generates the three-dimensional self-vehicle image on the basis of the self vehicle data that is read out from the storage unit.

This image generation device 2 can reduce the amount of computation while securing the quality of a self vehicle image.

The image generation device 2 according to the embodiment is further equipped with the signal reception unit which acquires vehicle information relating to the vehicle, and that the self vehicle data to be read out from the storage unit is switched according to the vehicle information.

This measure makes it possible to reduce the amount of computation while securing a self vehicle image that is good in appearance even in the case where the manner of display is changed.

In the image generation device according to the embodiment, the self-vehicle image is generated as a vehicle image as viewed from a different direction according to a requested point of view changed and a high-gloss portion is moved according to the requested point of view changed.

This measure makes it possible to reduce the amount of computation while securing a self vehicle image that is good in appearance even in the case where the point of view is changed.

<Modifications>

Although the embodiments of the invention have been described above, the invention is not limited to the embodiments and various modifications are possible. Such modifications will be described below. Elements selected from all of the elements described in the embodiments and elements described below can be combined together as appropriate.

Part of the functions described in the embodiment as being realized by the control unit 21 of the image generation device 2 may be realized by a control unit of the display device 3.

Although a description was made to the effect that in the embodiment each of various functions is implemented by software with computation by the CPU according to programs, part of those functions may be implemented by electrical hardware circuits. Conversely, part of functions described above as being implemented by hardware circuits may be implemented by software.

LIST OF REFERENCE SYMBOLS

1: Image display system
2: Image generation device
21: Control unit
211: Bird's eye image generation unit
212: 3d image generation unit
213: Image synthesis unit
22: Storage unit
221: Programs
222: Virtual point-of-view data
223: Self vehicle data
23: Image acquisition unit
24: Image output unit
25: Manipulation reception unit
26: Signal reception unit
3: Display device
31: Display panel
32: Touch panel
41: Manipulation buttons
5: Vehicular sensors
51: Shift sensor
52: Vehicle speed sensor
53: Clock unit
54: Temperature measuring unit
6: Plural cameras
6f: Front camera
6b: Rear camera
6l: Left side camera
6r: Right side camera
7: Self vehicle
7A: Self vehicle image

What is claimed is:

1. An image generation device comprising:
a nonvolatile memory which stores self vehicle data indicating a vehicle having multiple regions including a certain region and remaining regions other than the certain region, pieces of color information of the certain region having values so that the certain region is higher in brightness than the remaining regions; and
at least one hardware processor configured to:
(i) generate a neighborhood image that is an image of the vehicle and a neighborhood of the vehicle as viewed from a virtual point of view based on images taken by cameras installed in the vehicle;
(ii) generate a three-dimensional self-vehicle image being a three-dimensional image of the vehicle, based on the self vehicle data, the three-dimensional self-vehicle image representing the vehicle as if the certain region is illuminated with light based on the pieces of color information that are read out from the nonvolatile memory; and
(iii) generate a synthesized image in which the self-vehicle image is superimposed on the neighborhood image, wherein
the self vehicle data to be read out from the nonvolatile memory is switched to change which of the multiple regions is the certain region according to information of the vehicle which is acquired from an external sensor.

2. The image generation device according to claim 1, wherein the three-dimensional self-vehicle image is generated as a vehicle image as viewed from a different direction according to a requested point of view changed, in which the certain region is moved, amongst the multiple regions, according to the requested point of view changed.

3. An image generation method comprising:
(a) acquiring, by a hardware processor, images taken by cameras installed in a vehicle;
(b) storing, in a nonvolatile memory, self vehicle data indicating the vehicle having multiple regions including a certain region and remaining regions other than the certain region, pieces of color information of the certain region having values so that the certain region is higher in brightness than the remaining regions;
(c) generating, by the hardware processor, a neighborhood image that is an image of the vehicle and a neighborhood of the vehicle as viewed from a virtual point of view based on the acquired images;
(d) generating, by the hardware processor, a three-dimensional self-vehicle image which is a three-dimensional image of the vehicle based on the self vehicle data, the three-dimensional self-vehicle image representing the vehicle as if the certain region is illuminated with light based on the pieces of color information that are read out from the nonvolatile memory; and
(e) generating, by the hardware processor, a synthesized image in which the self-vehicle image is superimposed on the neighborhood image, wherein
the self vehicle data read out from the nonvolatile memory is switched to change which of the multiple regions is the certain region according to information of the vehicle which is acquired from an external sensor.

4. The image generation method according to claim 3, wherein the three-dimensional self-vehicle image is generated as a vehicle image as viewed from a different direction according to a requested point of view changed, in which the certain region is moved, amongst the multiple regions, according to the requested point of view changed.

* * * * *